(12) United States Patent
Cyoukyu et al.

(10) Patent No.: US 8,714,641 B2
(45) Date of Patent: May 6, 2014

(54) VEHICLE SEAT

(75) Inventors: Takeshi Cyoukyu, Yokohama (JP); Tomoyuki Nagano, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 248 days.

(21) Appl. No.: 13/141,020

(22) Filed: Jun. 20, 2011

(65) Prior Publication Data

US 2012/0001462 A1    Jan. 5, 2012

(30) Foreign Application Priority Data

Jun. 29, 2010 (JP) ................................. 2010-147976

(51) Int. Cl.
 *B60N 2/42* (2006.01)
(52) U.S. Cl.
 USPC ................................. 297/216.13; 297/216.14
(58) Field of Classification Search
 USPC ................ 297/216.13, 216.14, 395; 296/68.1
 See application file for complete search history.

(56) References Cited

U.S. PATENT DOCUMENTS

| | | | | |
|---|---|---|---|---|
| 3,170,725 A | * | 2/1965 | Komorowski | 296/63 |
| 3,528,703 A | * | 9/1970 | Ohta | 297/391 |
| 3,627,379 A | * | 12/1971 | Faust | 297/284.4 |
| 3,877,749 A | * | 4/1975 | Sakurai et al. | 297/216.14 |
| 4,718,720 A | * | 1/1988 | Braun et al. | 297/216.14 |
| 4,834,456 A | * | 5/1989 | Barros et al. | 297/403 |
| 5,112,109 A | * | 5/1992 | Takada et al. | 297/343 |
| 5,509,716 A | * | 4/1996 | Kolena et al. | 297/216.13 |
| 5,580,124 A | * | 12/1996 | Dellanno | 297/216.12 |
| 5,810,446 A | * | 9/1998 | Tadokoro | 297/452.18 |
| 6,398,299 B1 | * | 6/2002 | Angerer et al. | 297/216.12 |
| 6,733,064 B2 | * | 5/2004 | Fox et al. | 296/68.1 |

FOREIGN PATENT DOCUMENTS

| | | |
|---|---|---|
| FR | 2927581 | 8/2009 |
| JP | 11018871 A | 1/1999 |
| JP | 2009-137485 A | 6/2009 |
| JP | 2011-051532 | 3/2011 |

OTHER PUBLICATIONS

Japanese Office Action dated Mar. 19, 2013 in the corresponding Japanese Patent Application No. 2010-147976.

* cited by examiner

*Primary Examiner* — Peter Brown
(74) *Attorney, Agent, or Firm* — Knobbe Martens Olson & Bear LLP

(57) ABSTRACT

There is provided a vehicle seat including: a seatback including a seatback frame skeleton member covered by a seatback pad cushion member on at least a front side of the seatback frame; a headrest including a headrest frame skeleton member disposed above the seatback; and a shock absorbing member disposed further to the front side than the headrest frame and being at a top portion of the seatback, attached to the seatback frame and absorbing impact energy by plastic deformation when an impact is imparted to the top portion of the seatback from the front side.

5 Claims, 5 Drawing Sheets

VEHICLE SEAT

CROSS-REFERENCE TO RELATED APPLICATION

This application is based on and claims priority under 35 USC 119 from Japanese Patent Application No. 2010-147976 filed on Jun. 29, 2010, the disclosure of which is incorporated by reference herein.

BACKGROUND

1. Technical Field

The present invention relates to a vehicle seat.

2. Related Art

A vehicle rear seat is described in Japanese Patent Application Laid-Open (JP-A) No. 11-18871 with a seatback disposed with the vehicle body behind the seatback, and with a headrest attached to a top portion of the seatback.

Such a rear seat needs to absorb impact imparted by a seated occupant, such as during impact to the rear face of the vehicle, with the headrest and the seatback. A shock absorbing structure is therefore employed, for example with a thicker seatback pad (urethane pad) and/or employing polypropylene foam having high shock absorption properties for a portion of the seatback.

However, there are occasions when, due to the layout of the vehicle compartment, the seatback thickness dimension needs to be small (namely the seatback thin), and this presents problems to implementing a shock absorption structure like that described above.

SUMMARY

The present invention is made in consideration of the above circumstances and is directed towards obtaining a vehicle seat capable of securing shock absorption properties against impact to the seatback from the front while enabling the thickness dimension of the seatback to be set small (namely the seatback thin).

A first aspect of the present invention provides a vehicle seat including:

a seatback including a seatback frame skeleton member covered by a seatback pad cushion member on at least a front side of the seatback frame;

a headrest including a headrest frame skeleton member disposed above the seatback; and a shock absorbing member disposed further to the front side than the headrest frame and being at a top portion of the seatback, attached to the seatback frame and absorbing impact energy by plastic deformation when an impact is imparted to the top portion of the seatback from the front side.

In the vehicle seat of a first aspect of the present invention a shock absorbing member is disposed at a top portion of the seatback further to the seatback front side than the headrest frame of the headrest. The shock absorbing member is attached to the seatback frame and absorbs impact energy by plastic deformation when an impact is imparted to a top portion of the seatback from the front side. Accordingly, impact energy can be efficiently absorbed by the shock absorbing member plastically deforming. Shock absorption properties can be secured even when the dimension of the shock absorbing member along the seatback thickness dimension is set small. Consequently the thickness dimension of the seatback can be set smaller.

A second aspect of the present invention provides the vehicle seat of the first aspect, wherein:

the seatback is mounted to a vehicle in a state with a body panel forming a vehicle compartment behind the seatback; and the shock absorbing member is imparted with reaction force from the body panel side due to impact deforming the seatback frame towards the rear side, and the shock absorbing member plastically deforms.

In the vehicle seat of the second aspect of the present invention, the seatback frame deforms towards the rear when impact is imparted to the top portion of the seatback due to impact from the front side. The impact energy can thereby be absorbed. Further, the shock absorbing member plastically deforms when to the seatback frame deforms towards the rear and reaction force is imparted to the shock absorbing member from the body panel side. More impact energy can thereby be absorbed. The shock absorption properties can accordingly be raised due to absorption of impact energy by deformation of the seatback frame prior to impact energy absorption by the shock absorbing member.

A third aspect of the present invention provides the vehicle seat of the second aspect, wherein:

the seatback frame comprises a frame body portion and a wire frame portion formed with lower rigidity than the frame body portion and attached to the frame body portion; and a top end portion of the shock absorbing member is attached to the wire frame portion and a bottom end portion of the shock absorbing member is attached to the frame body portion.

The vehicle seat of the third aspect of the present invention includes a frame body portion and a wire frame portion attached to the frame body portion. The top end portion of the shock absorbing member is attached to the wire frame portion and the bottom end portion of the shock absorbing member is attached to the frame body portion. Due to the wire frame portion being formed with lower rigidity than the frame body portion, the wire frame portion deforms to the rear when impact is imparted from the front to the top portion of the seatback. Impact energy is thereby absorbed. Further, when the wire frame portion deforms towards the rear, the shock absorbing member attached to the top end portion of the wire frame portion is displaced to the rear (towards the body panel side) about its bottom end portion attached to the frame body portion. Reaction force can thereby be imparted to the shock absorbing member from the body panel side. The present invention can hence raise the shock absorption properties while securing sufficient rigidity of the frame body portion due to deforming the wire frame portion of lower rigidity than the frame body portion.

A fourth aspect of the present invention provides the vehicle seat of the third aspect, wherein:

a top edge portion of the wire frame portion is disposed further to the seatback top end side than a top end portion of the frame body portion; and the top end portion of the shock absorbing member is attached to the top end portion of the wire frame portion and the bottom end portion of the shock absorbing member is attached to the top end portion of the frame body portion.

In the fourth aspect of the present invention, the top end portion of the wire frame portion formed with lower rigidity than the frame body portion is disposed further to the seatback top end side than the top end portion of the frame body portion, enabling the center of gravity of the seatback to be set low.

A fifth aspect of the present invention provides the vehicle seat of the first aspect, wherein a top end portion and a bottom end portion of the shock absorbing member are attached to the seatback frame and a top-bottom direction intermediate portion of the shock absorbing member configures a bulge portion that bulges out further forward than the top end portion and the bottom end portion of the shock absorbing member.

In the vehicle seat of the fifth aspect of the present invention, a top-bottom direction intermediate portion of the shock absorbing member configures the bulge portion that bulges out further forward than the top end portion and the bottom end portion of the shock absorbing member attached to the seatback frame, and the bulge portion plastically deforms towards the rear due to impact from the front side. Good impact energy absorption can hence be achieved by setting the deformation stroke of the bulge portion (shock absorbing member) large.

A sixth aspect of the present invention provides the vehicle seat of the first aspect, wherein the shock absorbing member is formed from a sheet member in which plural through holes are formed provided inside a foam body configuring the seatback pad.

In the vehicle seat of the sixth aspect of the present invention, the shock absorbing member is provided inside the foam body configuring the seatback pad. The shock absorbing member is also formed from a sheet member in which plural through holes are formed, and hence molding properties when foam molding the foam body can be raised. Further, the deformation load of the shock absorbing member can be readily adjusted simply by changing the number and/or size of the plural through holes.

A seventh aspect of the present invention provides the vehicle seat of the first aspect, wherein the seatback is installed to a vehicle in a state in which a body panel configuring a vehicle compartment is behind the seatback, and the headrest is configured with the headrest frame connected to the body panel.

In the vehicle seat of a seventh aspect of the present invention, there is no need to provide a structure for connecting the headrest to a top portion of the seatback due to the headrest frame of the headrest being connected to the body panel. Consequently, the thickness dimension of the seatback can be set even smaller.

As explained above, the vehicle seat of the first aspect of the present invention can both secure shock absorption properties against impact to the seatback from the front and make the thickness dimension of the seatback small.

The vehicle seat of the second aspect of the present invention can raise the shock absorption properties due to impact energy absorption by deformation of the seatback frame prior to impact energy absorption by the shock absorbing member.

In the vehicle seat of the third aspect of the present invention, the shock absorption properties can be raised while still securing sufficient rigidity of the frame body portion due to deformation of the wire frame portion of lower rigidity than the frame body portion.

The vehicle seat of the fourth aspect of the present invention can set the center of gravity of the seatback in a low position.

The vehicle seat of the fifth aspect of the present invention can set a large deformation stroke of the shock absorbing member and can achieve good impact energy absorption.

The vehicle seat of the sixth aspect of the present invention can both raise the molding properties during foam molding of the seatback pad and can readily adjust the amount of impact energy absorption.

The vehicle seat of the seventh aspect of the present invention can make the thickness dimension of the seatback even thinner.

BRIEF DESCRIPTION OF THE DRAWINGS

Exemplary embodiments of the present invention will be described in detail based on the following figures, wherein.

DETAILED DESCRIPTION

Figure 1:
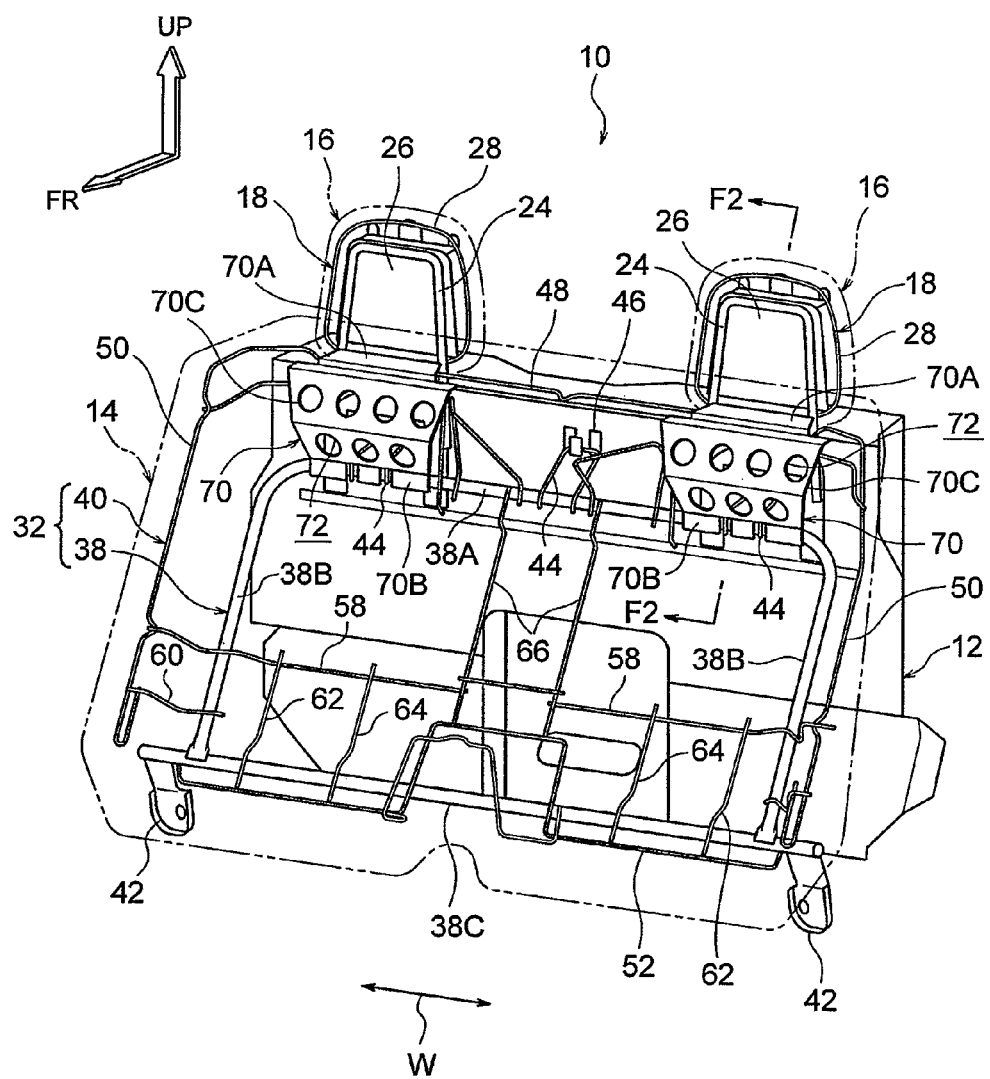
FIG. 1 is a schematic perspective view illustrating a configuration of relevant portions of a vehicle seat according to an exemplary embodiment of the present invention.

Explanation follows regarding a rear seat 10 serving as a vehicle seat according to an exemplary embodiment of the present invention with reference to FIG. 1 to FIG. 5. Arrows FR, arrows UP and arrows W in the drawings indicate the front direction, the top direction and the width direction of the rear seat 10, respectively. In the present exemplary embodiment the front direction, the top direction and the width direction of the rear seat 10 are substantially aligned with the front direction, top direction and width direction of the vehicle installed with the rear seat 10.

Figure 2:
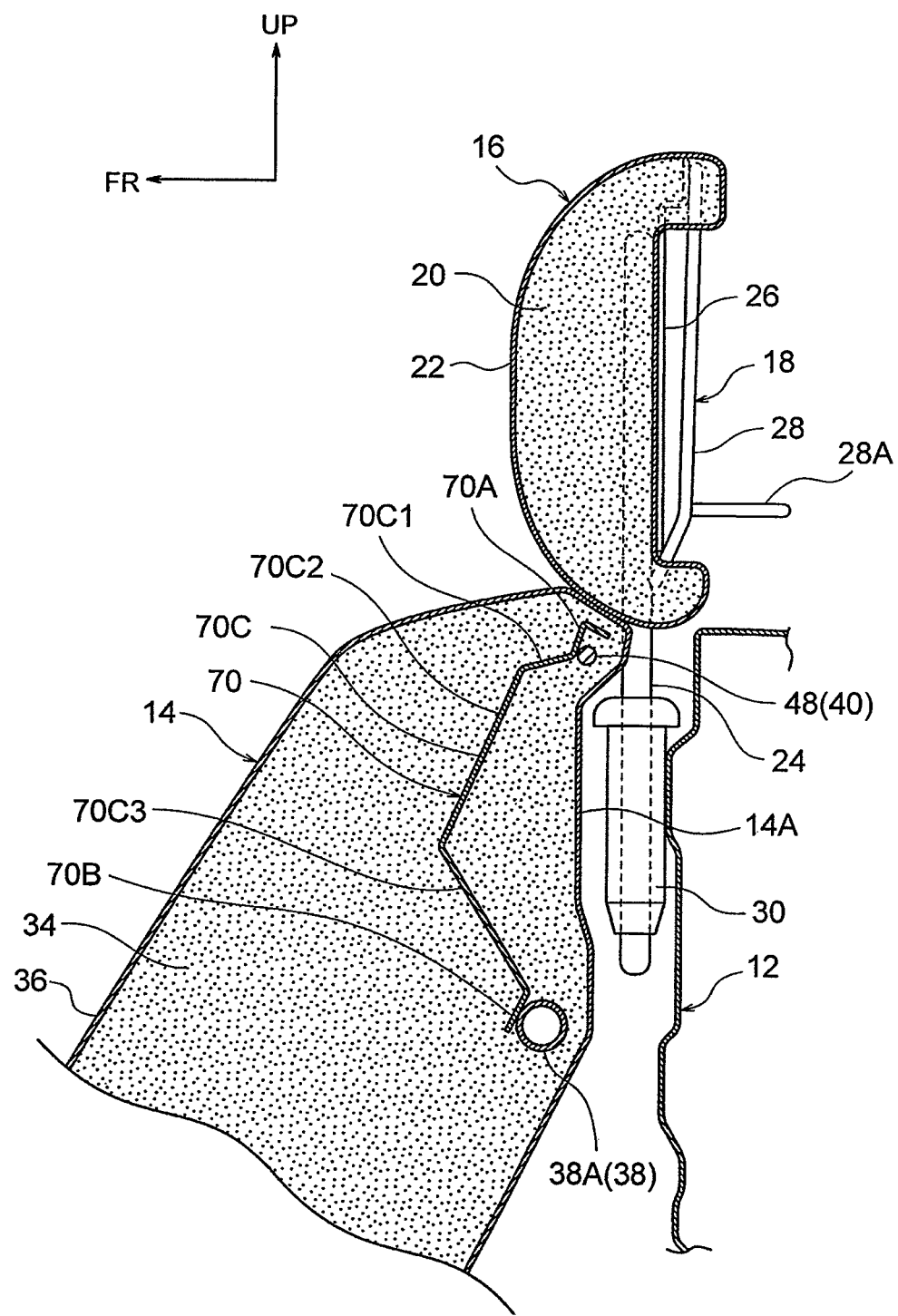
FIG. 2 is a cross-section taken on line F2-F2 of FIG. 1.
Figure 3:
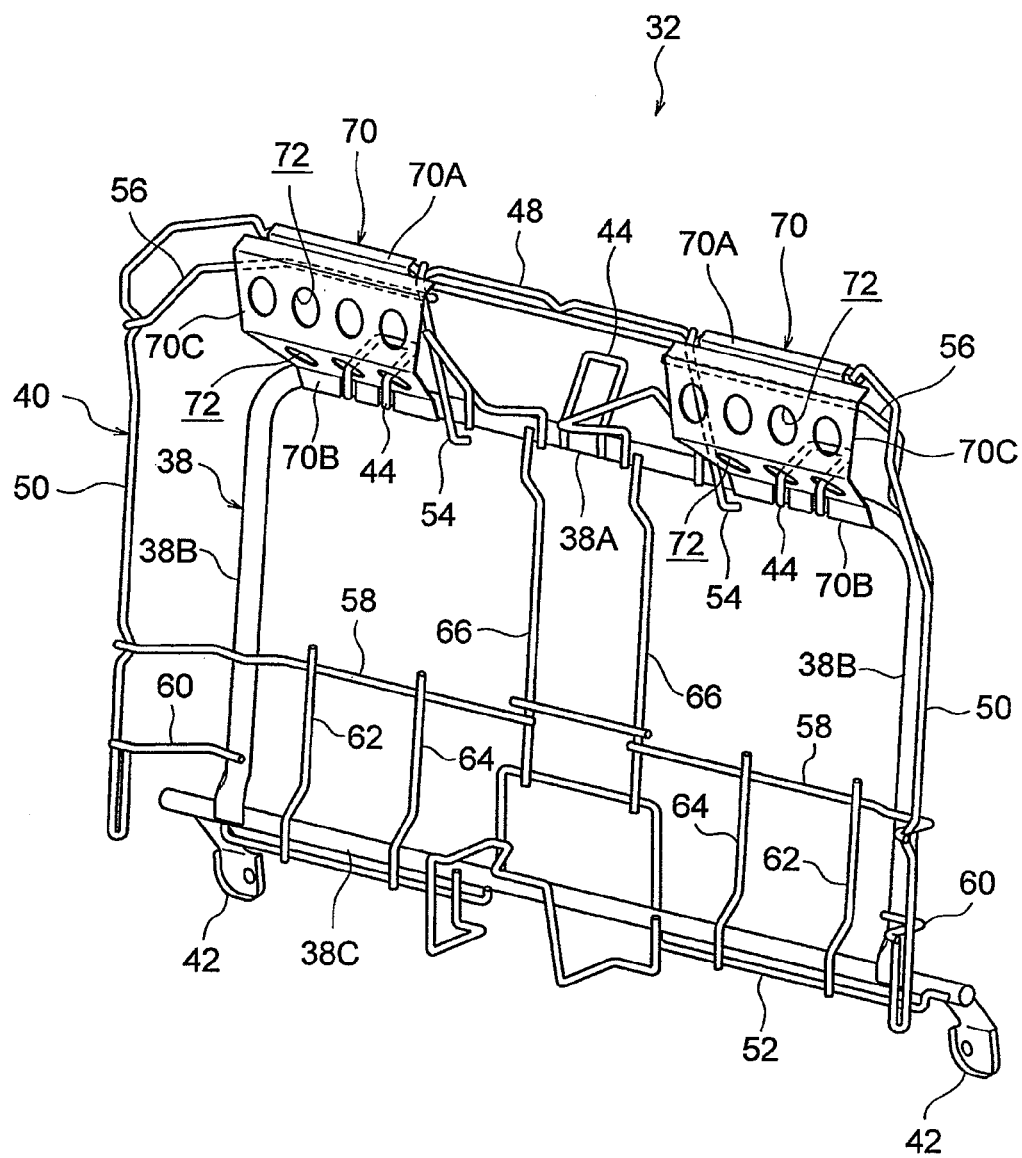
FIG. 3 is a perspective view of a seatback frame structural member of the vehicle seat shown in FIG. 1.

As shown in FIG. 1 and FIG. 2, the rear seat 10 according to the first exemplary embodiment is provided with a fixed seatback 14 disposed with a body panel 12 (vehicle body structural member) configuring the vehicle compartment behind the seatback 14. A seat cushion, not shown in the drawings, is disposed at the bottom of the seatback 14 in a configuration in which back regions of occupants seated on the seat cushion are supported by the seatback 14. A left and right pair of headrests 16 is provided above the seatback 14 to support the heads of respective seated occupants.

Each of the headrests 16 includes a headrest frame 18 which is a skeleton member, a headrest pad 20 supported by the headrest frame 18, with a headrest cover 22 covering the surface of the headrest pad 20. The headrest pad 20 is a cushion material, such as a foam body, for example a urethane pad.

The headrest frame 18 includes a frame body section 24 configured by processing a metal bar member into an inverted substantially U-shape, a plate section 26 formed from sheet metal material and welded to the frame body section 24, and a wire frame section 28 formed from a metal wire member and welded to both the frame body section 24 and the plate section 26. The frame body section 24 is integrally embedded within the headrest pad 20, as shown in FIG. 2 by integrated foam molding in which the top side of the frame body section 24 is set in a forming mold when foam molding the headrest pad 20. The bottom end portions of the frame body section 24 are projecting out below the headrest pad 20 and are mounted to headrest supports 30 fixed to the body panel 12 at the rear side of the seatback 14. The headrest 16 is thereby connected to (supported by) the body panel 12 through the headrest supports 30.

A cover fixing section 28A is provided projecting towards the vehicle rear at the bottom side of the wire frame section 28. A resin cover, not shown in the drawings, is fixed to the cover fixing section 28A.

The seatback 14 is configured including a seatback frame 32 (see FIG. 3) as a skeleton member, a seatback pad 34 supported by the seatback frame 32, and a seatback covering 36 covering the surface of the seatback pad 34. The seatback pad 34 is configured from a cushioning material of a foam body such as, for example, a urethane pad. The seatback frame 32 is set inside a forming mold when foam molding the seatback pad 34 in integrated foam molding. The seatback frame 32 is thereby embedded within the seatback pad 34. The seatback frame 32 includes a frame body section 38 formed in a rectangular frame shape as viewed along the seat front-rear direction, and a wire frame section 40 (wire frame section) formed with lower rigidity than the frame body section 38 is welded to the frame body section 38.

The frame body section 38 includes an upper section 38A extending along the seat width direction at a top portion of the seatback 14, a left and right pair of side sections 38B extending along the seat top-bottom direction at the left and right side portions of the seatback 14, and a lower section 38C extending along the seat width direction at the bottom edge of the seatback 14. The upper section 38A and the left and right side sections 38B are configured by processing metal pipe to end it into an inverted substantially U-shape. The lower section 38C is configured from straight metal pipe and is welded to the respective bottom ends of the left and right side sections 38B. The two length direction end portions of the lower section 38C project out further to the seat width direction outside than the left and right side sections 38B, with the projecting portions respective welded to an attachment bracket 42. The attachment bracket 42 is fastened to the vehicle body, thereby fixing the bottom edge of the seatback frame 32 to the vehicle body.

Attachment wires 44 are attached to a central portion and the left and right sides of the upper section 38A. The attachment wires 44 are formed by processing a metal wire member to bend it into inverted substantially U shapes, with the open sides (the bottom ends) of the attachment wires 44 welded to the upper section 38A. The attachment wires 44 are hooked over hooks 46 (see FIG. 1) fixed to the body panel 12, thereby fixing upper portions of the frame body section 38 to the vehicle body.

The wire frame section 40 is formed from a metal wire member and includes: a top wire 48 extending along the seat width direction at the top edge of the seatback 14; side wires 50 extending along the top-bottom direction at the left and right side portions of the seatback 14; and a bottom wire 52 extending along the seat width direction at the bottom edge of the seatback. The top wire 48 is disposed further to the top edge side of the seatback 14 than the upper section 38A of the frame body section 38. The side wires 50 are disposed further to the seat front side than the side sections 38B of the frame body section 38.

The two ends of the top wire 48 are welded to top end portions of the respective left and right side wires 50. The central side of the top wire 48 is connected through connecting wires 54, 56 to the top side of the upper section 38A and the side wires 50. The bottom end portions of the left and right side wires 50 are connected to the bottom wire 52 and the frame body section 38 through connecting wires 58, 60, 62, 64. The central side of the bottom wire 52 is connected to the upper section 38A through connecting wires 66.

A left and right pair of shock absorbing brackets 70 are attached to the above described seatback frame 32. The shock absorbing brackets 70 are formed by processing a sheet metal member (steel plate) to bend it into a hat-shaped cross-section, and are respectively disposed at the left and right sides at a top portion of the seatback 14. The 'top portion' of the seatback 14 refers to a top portion when the seatback 14 is sectioned into three equal sections of a top portion, a top-bottom direction intermediate portion and a lower portion, and is a position disposed at substantially the same height as the shoulder region of a seated occupant (a position disposed in the vicinity below each of the headrests 16).

As shown in FIG. 2, the shock absorbing brackets 70 are disposed such that the open side of the hat-shaped cross-section faces towards the seat rear side, with the rear face side of a top edge 70A welded to the top wire 48 (the top end portions of the wire frame section 40), and the rear face side of a bottom edge 70B welded to the upper section 38A (top end portions of the frame body section 38). The top edge 70A of each of the shock absorbing brackets 70 is bent to fold towards the seat rear side at a portion above the top wire 48 so as to project out towards the seat rear side. The method of attaching the shock absorbing brackets 70 to the seatback frame 32 is not limited to welding, and other attachment methods (fixing methods) may be employed. For example, configuration may be made with projection and/or indentation portions formed at the top edge side and/or bottom edge side of the shock absorbing brackets 70, and the seatback frame 32 (such as the top wire 48 and the upper section 38A) crimped onto (fitted into) the projection and/or indentation portions. Configuration may also be made with strap bands (cable ties) inserted through holes 72, described later, such that the shock absorbing brackets 70 are strapped onto the seatback frame 32 by the strap bands. Configuration may also be made using fasteners such as screws to fasten the shock absorbing brackets 70 to the seatback frame 32.

Each of the shock absorbing brackets 70 is configured with a bulge portion 70C at a top-bottom direction intermediate portion between the top edge 70A and the bottom edge 70B, bulging out further to the seat front side than the top edge 70A and the bottom edge 70B. The bulge portion 70C is formed with: an upper wall 70C1 projecting out diagonally downwards towards the seat front side from the bottom end of the top edge 70A; a front wall 70C2 extending out from the front edge (bottom edge) of the upper wall 70C1 towards the bottom of the seatback 14; and a lower wall 70C3 projecting diagonally downwards from the bottom edge of the front wall 70C2 towards the seat rear side. Plural circular shaped through holes 72 (omitted in FIG. 2) are formed in the front wall 70C2 and the lower wall 70C3 in lines along the seat width direction.

The so configured shock absorbing brackets 70 are set in the forming mold along with the seatback frame 32 when the seatback pad 34 is being foam molded so as to be integrally foam molded and embedded inside the seatback pad 34.

In the present exemplary embodiment, as shown in FIG. 2, the seatback 14 is formed with an upper portion back face 14A substantially parallel to the vehicle top-bottom direction, so as to secure a space for disposing the headrest support 30 between the back face 14A and the body panel 12. The above shock absorbing brackets 70 are disposed further towards the front than the headrest frames 18 of the headrests 16, with the top edges 70A of the shock absorbing brackets 70 normally disposed separated from the frame body section 24. The lower walls 70C3 of the shock absorbing brackets 70 are set with a length when viewed from the seat width direction of longer dimension than that of the upper wall 70C1, and the front walls 70C2 are disposed in the vicinity of thickness direction central portions of the seatback 14 in a substantially parallel state to the front face of the seatback 14. The front walls 70C2 function as bearing faces for receiving impact load input from the front side to the upper portion of the seatback 14. The upper walls 70C1 and the lower walls 70C3 function as support portions (legs) for supporting the front walls 70C2.

Explanation next follows regarding the operation and effect of the present exemplary embodiment.

The rear seat 10 configured as described above has the sheet metal shock absorbing brackets 70 disposed at the upper portion of the seatback 14 further forward than the headrest frames 18 of the headrests 16. The shock absorbing brackets 70 are embedded within the seatback pad 34 together with the seatback frame 32. The top edges of the shock absorbing brackets 70 are welded to the top wire 48 of the wire frame section 40, and the bottom edges of the shock absorbing brackets 70 are welded to the upper section 38A of the frame body section 38.

Figure 4:
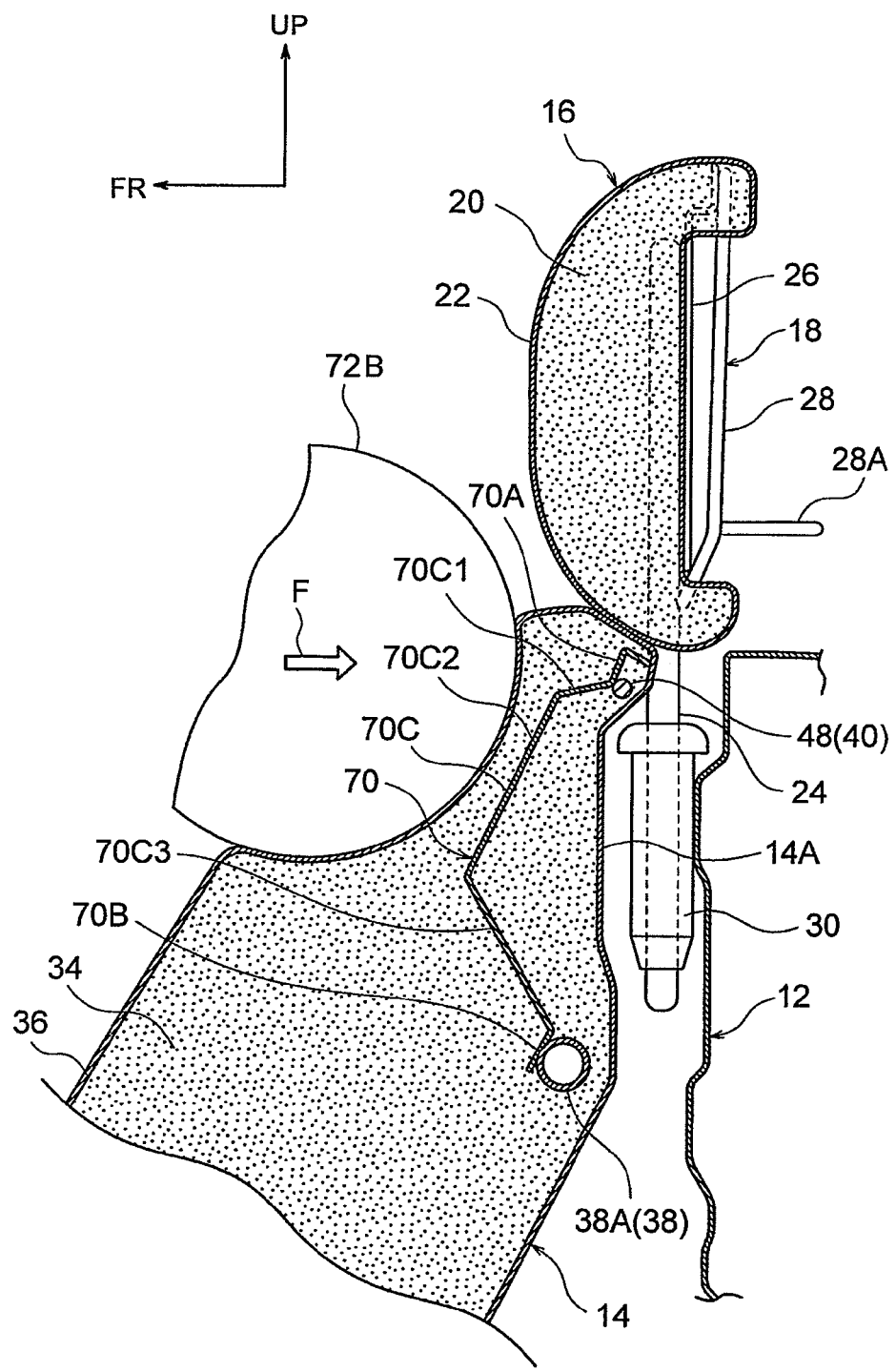
FIG. 4 is a cross-section illustrating a deformed state of a wire frame portion of a seatback frame due to an impact body impacting a top portion of the seatback shown in FIG. 2.
Figure 5:
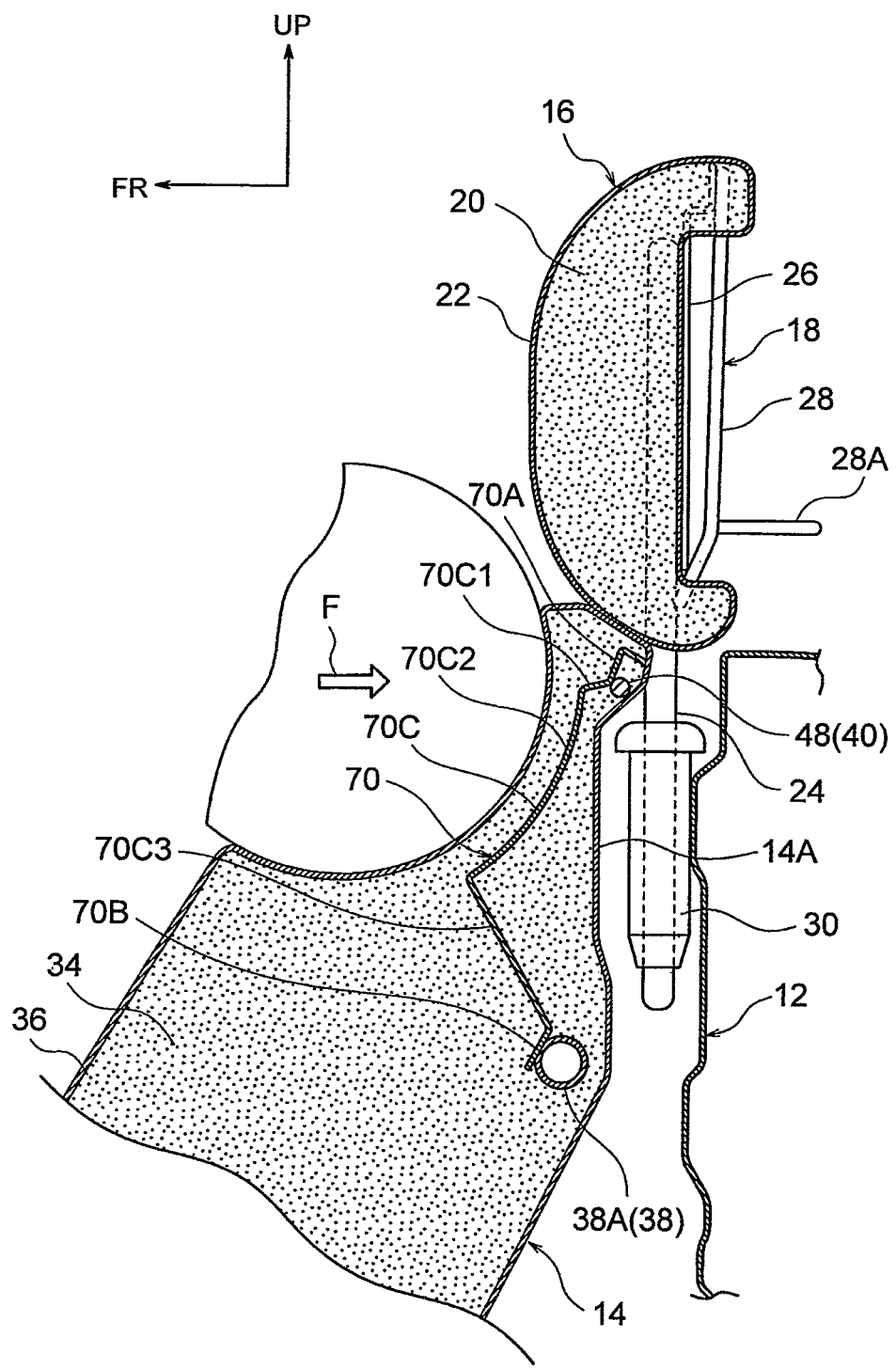
FIG. 5 is a cross-section corresponding to FIG. 4 in which a shock absorbing bracket has plastically deformed due to impact load from an impact body.

Accordingly, as shown in FIG. 4, when an impact body 72B impacts the upper portion of the seatback 14 from the front, load is input backwards onto the top wire 48 of the wire frame section 40 through the shock absorbing brackets 70. When the top portion side of the wire frame section 40 elastically or plastically deforms towards the rear, the top edge 70A of each of the shock absorbing brackets 70 engages with the respective headrest frame 18 (impinges on the frame body section 24 through the seatback covering 36. See the state illustrated in FIG. 4). As a result, when the top edges 70A of the shock absorbing brackets 70 are imparted with a reaction force from the body panel 12 side through the headrest frame 18, as shown in FIG. 5, the shock absorbing brackets 70 plastically deform (collapse) due to the impact load F from the impact body 72B. Impact energy of the impact body 72B is thereby absorbed.

Accordingly, due to the rear seat 10 being provided with the shock absorbing brackets 70 at the top portion of the seatback 14, acceleration energy of a seated occupant can be absorbed by the shock absorbing brackets 70 plastically deforming, even when relative rearward acceleration of the seated occupant occurs such as during an impact to the rear face of a vehicle (during a rear impact). Whiplash injury to a seated occupant, for example, can thereby be prevented or suppressed.

However, impact energy of the impact body 72B can be effectively absorbed in the rear seat 10, due to impact energy of the impact body 72B being use to plastically deform (collapse) the shock absorbing brackets 70. Accordingly, since shock absorption ability can be secured even when the dimension of the shock absorbing brackets 70 along the thickness direction of the seatback 14 (the seatback 14 front-rear direction) is set small, the thickness dimension of the seatback 14 can be set thin. Consequently, such a configuration is particularly effective when due to layout of the vehicle compartment sufficient thickness dimension of the seatback 14 cannot be secured, or when sufficient clearance cannot be achieved between the back face of the seatback 14 and the body panel 12.

In the rear seat 10 there is no need to provide a structure for connecting the headrests 16 to top portions of the seatback 14 due to the headrest frames 18 of the headrests 16 being connected to the headrest supports 30 that are fixed to the body panel 12. Accordingly the thickness dimension of the seatback 14 can be made even smaller.

In the rear seat 10, as described above, due to the wire frame section 40 of the seatback frame 32 deforming prior to plastic deformation of the shock absorbing brackets 70, impact energy can also be absorbed by deformation of the wire frame section 40. Shock absorption ability can consequently be raised.

In the rear seat 10 the seatback frame 32 is provided with the frame body section 38 and the wire frame section 40 formed with lower rigidity than the frame body section 38. Due to the wire frame section 40 deforming due to impact from the seat front side, shock absorption ability can be raise while still securing sufficient rigidity of the frame body section 38.

In the rear seat 10, the top end portions of the wire frame section 40 formed with lower rigidity than the frame body section 38 are disposed further to the top end side of the seatback 14 than the top end portions of the frame body section 38, and hence the center of gravity of the seatback 14 can be set at a low position.

In the rear seat 10 the shock absorbing brackets 70 are configured with the bulge portions 70C bulging out further forwards than the top edges 70A and the bottom edges 70B that are fixed to the seatback frame 32 at a top-bottom direction intermediate portion, and accordingly the bulge portions 70C are deformed plastically towards the rear side by impact from the front. Consequently, the deformation stroke of the bulge portions 70C (the shock absorbing brackets 70) can be set large, and good impact energy absorption can be achieved.

The shock absorbing brackets 70 in the rear seat 10 are also formed with the plural through holes 72, and so molding characteristics when foam molding the seatback pad 34 are enhanced. Further, the deformation load of the shock absorbing brackets 70 can, be also be adjusted by varying the number and size of the plural through holes 72.

In the rear seat 10, in the normal seated state of a seated occupant, since the shock absorbing brackets 70 are disposed at top portions of the seatback 14 that do not make hard contact with the back region of an occupant a detrimental effect on the seating comfort of an occupant can be avoided.

In the above exemplary embodiment the shock absorbing brackets 70 (shock absorbing members) are configured from sheet metal material (sheet members) formed with the plural through holes 72. However, the first to the fifth aspects of the present invention are not limited thereto, and configuration may be made omitting the through holes 72. The shock absorbing members may also be configured by wire or the like.

In the above exemplary embodiment the shock absorbing brackets 70 (shock absorbing members) are configured with the bulge portion 70C between the top edge 70A and the bottom edge 70B. However, the first to the fourth aspects of the present invention are not limited thereto, and the shape of the shock absorbing members can be modified as appropriate.

In the above exemplary embodiment the seatback frame 32 is configured with the frame body section 38 and the wire frame section 40. However, the first to the third aspects of the present exemplary embodiment are not limited thereto and the configuration of the seatback frame may be modified as appropriate.

In the above exemplary embodiment configuration is made with the top end portion of the wire frame section 40 is disposed further to the top edge side of the seatback 14 than the top end portions of the frame body section 38, with the top edge portion of the shock absorbing brackets 70 attached to the wire frame section 40 and the bottom edge portions of the shock absorbing brackets 70 attached to the top ends of the frame body section 38. However, the first to the third aspects of the present invention are not limited thereto, and the disposition of the wire frame section 40 and the frame body section 38, and the attachment method of the shock absorbing brackets 70 to the wire frame section 40 and the frame body section 38 may be modified as appropriate.

In the above exemplary embodiment reaction force from the body panel 12 side due to the wire frame section 40 (the seatback frame 32) deforming towards the rear side is imparted to the shock absorbing brackets 70 which undertake plastic deformation. However, the first aspect of the present invention is not limited thereto, and configuration may be made such that the shock absorbing members are directly imparted with reaction force from the seatback frame and plastically deform.

In the above exemplary embodiment configuration is made with the headrest 16 connected to the body panel 12 through the headrest support 30. However, the first to the sixth aspects of the present invention are not limited thereto, and configuration may be made with the headrests 16 connected to the seatback frame 32.

In the above exemplary embodiment configuration is made such that the shock absorbing brackets 70 are imparted with reaction force from the body panel 12 side through the headrest frame 18. The first to the seventh aspects of the present invention are however not limited thereto, and configuration may be made such that the shock absorbing brackets 70 are imparted with reaction force from the body panel 12 side not through the headrest frame 18.

Various other modifications may be implemented within a scope not departing from the spirit of the invention. Obviously the scope of rights of the present invention is not limited by the above exemplary embodiments.

What is claimed is:

1. A vehicle seat comprising:

a seatback comprising a seatback frame skeleton member covered by a seatback pad cushion member on at least a front side of the seatback frame, the seatback being mounted to a vehicle, the seatback frame comprising a frame body section and a wire frame section having lower rigidity than the frame body section; and a shock absorbing member having a top end portion and a bottom end portion, the top end portion being attached to the wire frame section and the bottom end portion being attached to the frame body section, the shock absorbing member being disposed forwardly of the frame body section and being at a top portion of the seatback so as to absorb impact energy by plastic deformation.

2. The vehicle seat of claim 1, wherein:

a top end portion of the wire frame section is disposed further to a seatback top end side than a top end portion of the frame body section; and the top end portion of the shock absorbing member is attached to the top end portion of the wire frame section and the bottom end portion of the shock absorbing member is attached to the top end portion of the frame body section.

3. The vehicle seat of claim 1, wherein a top-bottom direction intermediate portion of the shock absorbing member configures a bulge portion that bulges out further forward than the top end portion and the bottom end portion of the shock absorbing member.

4. The vehicle seat of claim 1, wherein the shock absorbing member is formed from a sheet member in which a plurality of through holes are formed provided inside a foam body configuring the seatback pad.

5. The vehicle seat of claim 1 further comprising a headrest having a headrest frame, the headrest frame being connected to a body panel.

* * * * *